Aug. 12, 1969  R. G. FONTANA  3,460,256
HANDTOOL FOR ADJUSTING DENTURES
Filed July 10, 1967
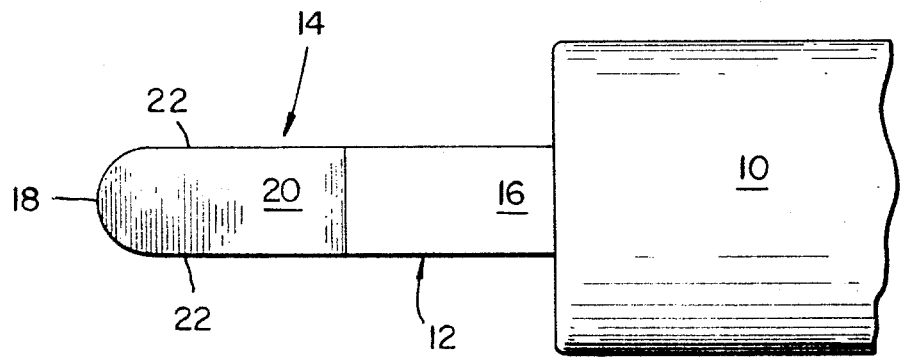
FIG_1
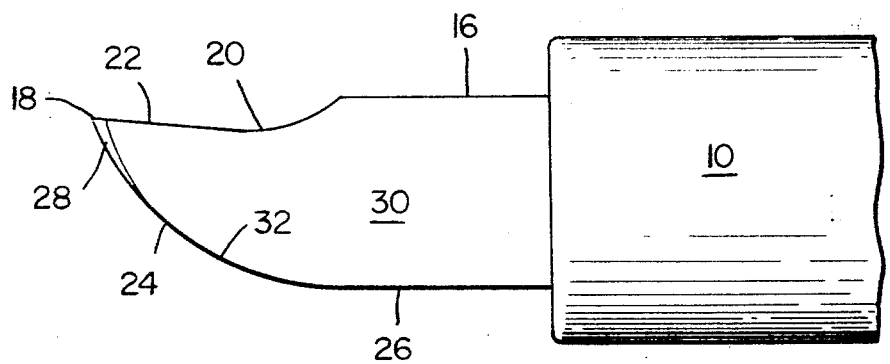
FIG_2
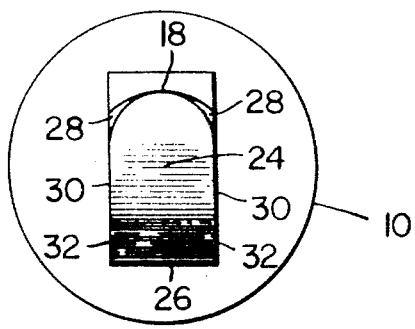
FIG_3
*INVENTOR.*
RALPH G. FONTANA
BY
*Townsend and Townsend*
ATTORNEYS United States Patent Office 3,460,256
Patented Aug. 12, 1969

3,460,256
HANDTOOL FOR ADJUSTING DENTURES
Ralph G. Fontana, 7645 Giusti Road,
Forestville, Calif. 95436
Filed July 10, 1967, Ser. No. 652,340
Int. Cl. A61c 3/00
U.S. Cl. 32—40                                    4 Claims

ABSTRACT OF THE DISCLOSURE

A handtool for adjusting dentures having a handle, a cutting tip formed on a shank secured to the handle, the tip having an arcuate forward edge, a concave upper surface and a convex lower surface. These surfaces meet together to form an arcuate forward cutting edge which is faired into the flat side surface of the shank. The edges at which the side surfaces meet the convex lower surface form additional cutting edges.

---

This invention relates to handtools and more particularly to a handtool for scraping the inside surface of dentures in order to adjust the dentures to the wearer's mouth.

One of the most common problems associated with the wearing of dentures is the necessity for adjusting the fit of the dentures to the gums. The shape of the gums over which the dentures fit changes due to resorption of the bones underlying the gums. As the shape changes, the cooperating surface of the denture irritates the gums and leads to discomfort, pain and abrasion.

When denture wearers return to their dentists for adjustment of the dentures, the process of removing material and fitting and refitting the dentures is time-consuming and therefore expensive. A great many denture wearers therefore make attempts to adjust the dentures themselves. They often use a variety of tools which are neither proper for the work to be done, nor satisfactory. Such tools include nail files, screw drivers, table knives and the like. Not only are such tools unsatisfactory for scraping away the "high spots" in the extremely hard methyl methacrylate and vinyl copolymer plastics from which the denture may be made, but accidental cuts are all too likely as well.

The present invention is designed to be used not only by dentists but also by denture wearers for adjustments to their own dentures. It is designed to permit an unskilled person such as the average denture wearer to quickly and easily remove material from the denture in order to refit the denture to his mouth.

The preferred embodiment of the invention comprises a cutting member, preferably made of high quality stainless steel, shaped in such a manner as to be useful for removing material from the various parts of the gum-receiving recesses of dentures. The cutting member is secured to a handle so that it may be readily held in the hand for the scraping and cutting operation.

The cutting member is shaped to permit the tool to be used in a number of ways. The leading edge is arcuate to permit reaching deep into the recesses of the dentures to remove material. Both the upper and lower side edges of the cutting member are also sharpened so that scraping may be accomplished along a substantial area for removal of material and smoothing and by means of differently shaped cutting edges. The upper surface is concave in order to permit ease in sharpening and to yield a tapering leading edge at the point at which the upper surface meets the convexly-shaped undersurface.

In the drawings:
FIG. 1 is a plan view of the handtool greatly enlarged;
FIG. 2 is a similar side view of the handtool; and
FIG. 3 is an enlarged front view of the tool.

Referring now more particularly to the drawing in which similar characters of reference represent corresponding parts in each of the several views, the tool comprises a handle 10 to which is secured the cutting blade 12. The blade 12 comprises a forward cutting tip 14 and a shank 16, the shank being secured in the handle.

In the preferred embodiment the blade 12 is made of a rectangular piece of steel approximately $3/32$ inch thick by $3/16$ inch wide, preferably tool quality stainless steel. The leading edge 18 of the cutting tip has an arcuate shape when viewed from above, the diameter of which is approximately the width of the shank. Sloping backward and downward from the leading edge is a concave upper surface 20. The trailing side edges 22 of the blade lead backward from the arcuate leading edge, the full thickness of shank 16.

The lower surface 24 of the cutting tip has a generally convex shape when viewed from the side, curving downward from the arcuate leading edge 18 to the bottom surface 26 of the shank. The forward undersurfaces 28 of the arcuate leading edge are rounded to conform to the arcuate shape of the edge and to fair the arcuate shape into the flat sides 30 of the shank and the convex lower surface 24. The underside edges 32 are the junctions of sides 30 with the lower surface 24.

All the edges of the cutting tip leading edge 18, trailing side edges 22 and underside edges 32 are sharpened so that a variety of shaped cutting edges is available for scraping and cutting the denture plastic.

I claim:
1. A handtool for scraping and cutting dentures to adjust them to fit properly comprising: a cutting blade having a concave upper surface and a substantially convex lower surface, the surfaces meeting together to form an arcuate forward cutting edge; said cutting blade having substantially vertical, flat side surfaces trailing back from said arcuate forward cutting edge, said surfaces faired into said arcuate forward cutting edge and said convex lower surface; the edges at which the side surfaces meet the convex lower surface forming additional cutting edges; a shank portion extending rearward from the cutting blade; and an elongated handle to which said shank is secured.

2. A handtool for making adjustments in dentures comprising: a handle; a shank secured to the handle; a cutting tip disposed at the free end of the shank; the leading edge of said tip having an arcuate shape, trailing side edges, an upper surface and a lower surface, the diameter of said arcuate shape being the width of the shank; the trailing side edges of the tip leading back from the arcuate leading edge of the tip to the full width of the shank; the upper surface of the tip being concave and gradually curving downward, backward and upward from the leading edge of the tip toward the shank; and the lower surface of the tip being convex and gradually curving backward and downward from the leading edge of the tip toward the shank.

3. The handtool of claim 2 wherein the trailing side edges are sharpened to form additional cutting edges.

4. The handtool of claim 2 wherein the tip has substantially flat sides which meet the convex lower surface to form arcuate side cutting edges from the leading edge of the tip to the shank.

References Cited

UNITED STATES PATENTS

| 788,909 | 5/1905 | Ivory | 32—40 |
| 822,928 | 6/1906 | Delano | 32—50 |
| 945,713 | 1/1910 | Fritz | 32—40 |

ROBERT PESHOCK, Primary Examiner